(12) United States Patent
Calvert et al.

(10) Patent No.: US 7,328,106 B2
(45) Date of Patent: Feb. 5, 2008

(54) METHOD OF CORRECTING DENSITY LOGS FOR THE PRESENCE OF THE CASING

(75) Inventors: Stefan Eric Edward Calvert, Westmoorings (GB); Charles Alexander Pereira, Loughborough (GB); James Roger Samworth, Ashby da la Zouch (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 0 days.

(21) Appl. No.: 11/145,063

(22) Filed: Jun. 3, 2005

(65) Prior Publication Data

US 2005/0234649 A1  Oct. 20, 2005

Related U.S. Application Data

(63) Continuation of application No. 10/394,671, filed on Mar. 21, 2003, now Pat. No. 6,909,969.

(30) Foreign Application Priority Data

Apr. 12, 2002 (GB) .......................... 20020208410.1

(51) Int. Cl.
*G01V 5/04* (2006.01)
*G01V 5/10* (2006.01)

(52) U.S. Cl. .......................................... 702/8; 250/266
(58) Field of Classification Search ................ 702/1–8; 250/256, 269.2, 266
See application file for complete search history.

(56) References Cited

U.S. PATENT DOCUMENTS

| | | | | | |
|---|---|---|---|---|---|
| 3,462,600 | A | * | 8/1969 | Dewan | 250/261 |
| 3,567,935 | A | * | 3/1971 | Nagel | 250/264 |
| 3,567,936 | A | * | 3/1971 | Tittman | 250/264 |
| 4,297,575 | A | | 10/1981 | Smith, Jr. et al. | 250/265 |
| 4,642,460 | A | | 2/1987 | Wallace | 250/256 |
| 4,645,926 | A | | 2/1987 | Randall | 250/256 |
| 5,528,030 | A | | 6/1996 | Mickael | 250/269.4 |
| 5,684,299 | A | * | 11/1997 | DasGupta | 250/269.2 |
| 6,909,969 | B2 | * | 6/2005 | Calvert et al. | 702/8 |

OTHER PUBLICATIONS

UK Patent Office Search Report; issued on application No. GB 0208410.1, 1 page.
"The Dual-Spaced Density Log-Characteristics, Calibration and Compensation" J.R. Samworth, The Log Analyst, Feb. 1992.

* cited by examiner

*Primary Examiner*—John Barlow
*Assistant Examiner*—Victor J. Taylor
(74) *Attorney, Agent, or Firm*—Paul & Paul (57) ABSTRACT

A gas detection method includes carrying out respective neutron and density logs, using neutron and density detectors, along a length of well. The density log is corrected for the dimensions and properties of the well casing. The corrected density log is then combined with the neutron log to compensate for regions of artificially high density outside the casing. The compensated density log is continuously calibrated against the neutron log. The dynamically calibrated density and neutron logs are inspected for crossovers that signify the presence of gas in a formation.

29 Claims, 6 Drawing Sheets

METHOD OF CORRECTING DENSITY LOGS FOR THE PRESENCE OF THE CASING

RELATED APPLICATIONS

This application is a continuation of U.S. patent application Ser. No. 10/394,671, filed Mar. 21, 2003 now U.S. Pat. No. 6,909,969, which claims priority of United Kingdom patent application number 20020208410.1, filed Apr. 12, 2002.

BACKGROUND OF THE INVENTION

This invention relates to a method of through-casing gas detection; and to apparatuses for carrying out such a method.

In the technical field of oil production there are numerous important, technical reasons for identifying the presence of gas in a formation.

It is generally considered essential to acquire a good quality density log of a well, in order to provide for reliable gas detection.

Before completion of a well it is possible to obtain accurate density logs in open-hole. This is so even when there is mudcake in the well. Under that circumstance it is possible to compensate the density log for example using one or more of the techniques disclosed in "The Dual-Spaced Density Log—Characteristics, Calibration and Compensation"—Samworth, The Log Analyst, February 1992.

Until quite recently it was generally regarded as impossible to obtain the high-accuracy density logs following casing of the well.

However, it is possible to approximate the material of the casing to a mudcake of high density. Consequently it is possible to employ the spine/rib technique in the form specified in the above-mentioned paper by Samworth to obtain a log that is corrected for the effects of the casing.

A drawback of this technique, however, is that it cannot simultaneously correct for the irregular, cement-filled annulus encircling the steel casing following completion of the well. In addition, the dimensions of the annulus are such as to affect the accuracy of the spine/rib method.

When logging to identify gas, one usually compares the density-derived formation porosity with that derived from a neutron log. Following calibration of these measurements to read correctly in fluid-filled porosity, the presence of gas-filled porosity makes the neutron porosity log read low and the density porosity read high. When this happens the log traces deflect in opposite directions and when plotted appropriately cross over one another in a characteristic fashion. The crossover is therefore used to indicate the presence of gas.

Because the crossover depends principally on divergent log plot directions, it is possible to detect gas by comparing the character of the neutron and density logs without necessarily analysing in detail the absolute values of the logs.

However, when logging through steel casing, cavities located radially outwardly of the casing give rise to similar log plot crossovers as gas.

The mis-characterisation of cavities as gas-filled regions of the formation is a significant disadvantage of using neutron and density logs in combination to identify gas in a formation.

A further problem concerns the use of casing collars to join adjacent lengths of tubular casing together.

There are two kinds of casing joint in common use.

In flush jointed casing a threaded, tubular spigot of reduced diameter compared with the outside diameter of the casing protrudes from one end of a length of casing. The spigot is received in a threaded socket formed in one end of an adjacent length of casing. The socket has an inside diameter slightly greater than the inside diameter of the remainder of the casing.

When the casing lengths are screwed tightly together the effect is of a continuous wall of substantially constant thickness in the vicinity of the threaded parts.

Consequently a flush joint does not significantly affect the accuracy of gas detection logs.

A casing collar, on the other hand, that is an alternative means of joining lengths of a casing together, constitutes a steel annulus encircling the exterior of the casing in the vicinity of each joint.

The very nature of the casing collars emphasises the likelihood that they will influence the accuracy of a density log.

More specifically, casing collars cause the density log to read high density values over short distances.

Aside from securing adjacent casing lengths together, casing collars on the other hand are regularly spaced along the casing. Consequently their presence can be logged using a tool called a magnetic casing collar locator, that typically is deployed in conjunction with other downhole equipment to provide an accurate, absolute depth measurement.

There exist many oil wells whose productivity has declined in recent years. Such wells probably contain secondary hydrocarbon-bearing formations, that are not readily identifiable using conventional logging techniques. Hitherto the cost of comprehensively logging such wells using a sequence of techniques has been prohibitively high.

According to a first aspect of the invention there is provided a method of through-casing gas detection comprising the steps of:

(a) carrying out a plurality of respective neutron and un-compensated density logs, using neutron and density detectors, along a length of well;

(b) independently correcting each un-compensated density log for the dimensions and properties of the casing; and (c) combining the thus-corrected density logs and the neutron logs so as to compensate for one or more regions outside the casing of artificially high density, wherein the method includes the steps of:

(d) continuously dynamically calibrating the resulting compensated density logs against the neutron logs;

(e) carrying out a comparison between the thus calibrated logs and the neutron logs; and (f) identifying gas crossovers from the said comparison.

The method of the invention advantageously compensates for the effects of the casing, the cement annulus and any voids behind the casing. Thus the method offers an improved technique for the through-casing detection of gas formations.

The method can include the steps of:

(g) as necessary, detecting the presence of casing collars; and (h) removing their effects from the density logs.

More specifically the steps (g) and (h) can occur before step (c).

The foregoing features of the method of the invention additionally allow elimination of the effects of casing collars, when these are present. Conveniently the step (g) includes the step of:

(i) identifying as the effect of a collar an anomalously high value of the shorter spaced density log. This takes advantage of the effect of the casing collar in preferentially perturbing the shorter spaced density log data.

The step (h) can also include the step of:
(j) for each collar effect detected in the logs, the substitution of non-collar affected data. Such non-collar affected data is that which is immediately preceding the collar effect in question.

In other words, the first embodiment of the method of the invention substitutes data from regions of the well that do not coincide with the casing collars, for the anomalously high values that arise in the short spaced detector in such locations.

Step (b) includes one or more of the steps of:
(k) modelling the effect of the casing using a modelling database; or
(l) calibrating the logs using a casing calibration database.

These techniques are advantageously reliable.

Alternatively, the step (b) may optionally include correcting the logs for effects of the casing using an iterative downhole calibration technique that is database-independent. While this method may be less precise, the absolute level of the log is not important in the method, as previously explained.

The foregoing technique may offer advantages in terms of computer processing power and response times.

Conveniently step (c) includes the step of:
(m) approximating the integrated geometric factor (G) of the well/density detector combination to an exponential function of the density log penetration depth.

There is a detailed description of this technique in the paper by Samworth mentioned hereinabove. The entirety of this paper is incorporated herein by reference.

Preferably step (c) further includes (n) further approximating the exponential function to linear form.

There is a description of this technique in the aforementioned paper by Samworth.

Instead of the steps (m) and (n) specified herein, step (c) of the method of the invention may alternatively include the step (o) of:
approximating the integrated geometric factor (G) of the density measurement to a series of straight lines.

The respective method steps (m) and (n) or (o) lend themselves to computation by different computational methods. It is possible for the logging engineer within the scope of the invention to use the method that is most appropriate to the prevailing circumstances.

In a particularly preferred embodiment of the invention, step (d) includes the steps of, after carrying out steps (g), (h), (i) and (j) as necessary,
(p) applying a long averaging filter to the neutron and density data resulting from the logs;
(q) calculating the difference between the thus filtered logs, by subtracting the density values from the neutron values; and
(r) adding the differences resulting from step (q) to the corresponding parts of the density logs.

An advantage of this aspect of the invention is that the long averaged data is not skewed or otherwise perturbed by the high short spaced detector readings that would otherwise be present as a result of any collars surrounding the casing.

A further, optional feature of the invention involves the step of:
(s) screening spurious crossovers by comparing the crossovers to a further, lithology-sensitive log that is substantially insensitive to casing effects. Preferably the further log is a natural gamma ray log. Even more preferably, the natural gamma ray log is recorded simultaneously with the density and neutron logs.

The invention as defined hereinabove allows highly accurate through-casing gas detection to take place. It is in addition desirable to carry out the method as defined hereinabove simultaneously with one or more of:
a neutron oil/water or water/gas contact log; and/or
an acoustic cement bond log.

These method steps allow the economic and accurate logging of wells whose secondary hydrocarbon formations have hitherto been uneconomical to log.

In a preferred embodiment, the method is carried out using a single tool. Such a tool may contain all of the logging devices necessary to carry out the essential and preferred steps defined herein.

Even more preferably the tool is a compact battery/memory tool. Such a tool is self-powered and does not require a conventional armoured wireline for telemetry purposes.

By "compact" is meant a tool whose outside diameter is less than 2¼ inches. Such a tool is capable of more easily accessing narrow and otherwise difficult wells, than a tool of conventional diameter (ie. 3½ inches or greater).

The invention is also considered to reside in data acquired by the method steps defined herein.

According to a further aspect of the invention there is provided a well logging tool and data processing apparatus combination comprising a neutron sonde and a density sonde each secured in the tool, the density sonde including a caliper for urging the density sonde into contact with the interior surface of a casing string, the neutron sonde and the density sonde being operatively connectable to one or more programmable devices that are programmed to carry out at least steps (b)-(e) of claim 1 hereof.

Such a logging tool is of course advantageously suited to carrying out the method of the invention as defined herein.

Advantageous, optional features of the invention are defined in claims 21 to 28 hereof.

BRIEF DESCRIPTION OF THE DRAWINGS

The features, advantage and operation of the present invention is apparent and further understood from a reading of the following detailed description by way of non-limiting example, with reference being made to the accompanying drawings in which:

FIG. 5b is a continuation of the schematic block diagram of FIG. 5a.

DETAILED DESCRIPTION OF THE INVENTION

Figure 1:
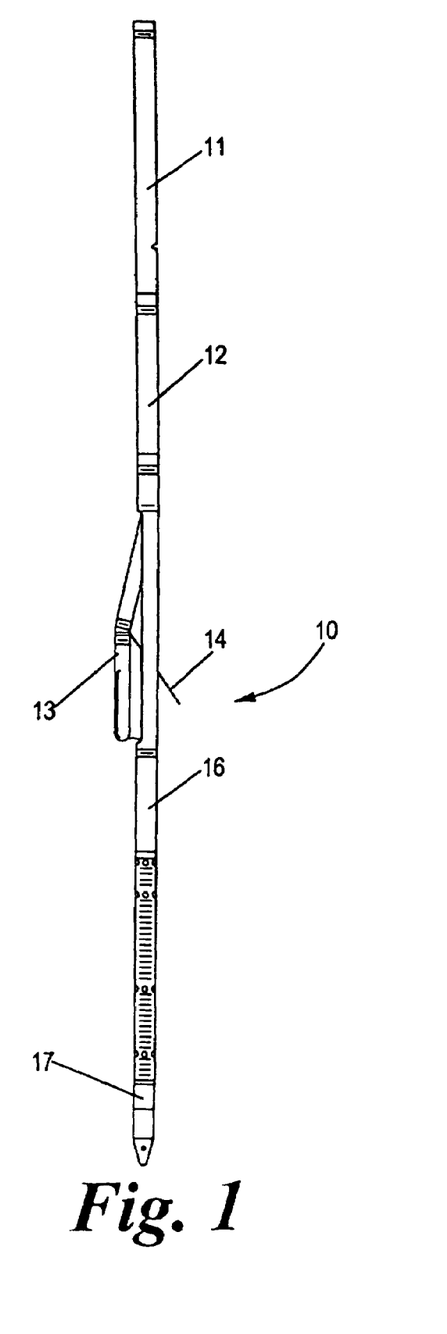
FIG. 1 is a schematic view of a wireline tool, according to an aspect of the invention, that is capable of carrying out the method of the invention.
Figure 2:
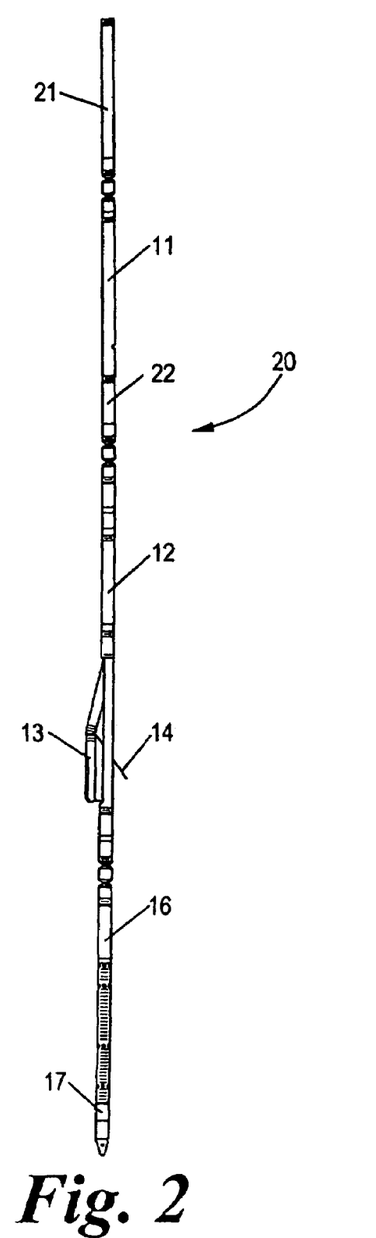
FIG. 2 is a schematic view of a self-powered battery/memory tool, according to an aspect of the invention, that is capable of carrying out the method of the invention.

A method according to the invention involves the use of a logging tool as shown in FIG. 1 or FIG. 2, that may be deployed in a well and subsequently used to log the well. A typical logging operation involves pumping or otherwise conveying the tool to the total depth of the well; and logging the well during withdrawal of the tool to the surface.

As noted herein, the tool may be a compact battery/memory tool as shown in FIG. 2; or a more conventional wireline tool as shown in FIG. 1.

If the tool is of the former kind, the logged data are downloaded from the tool memory following recovery of the tool to a surface location. The data are then processed in accordance with the method of the invention, for example using a digital computer.

If the tool is of the latter kind, the electronics section of the tool may include one or more driver circuits capable of effecting telemetry of the logged data via a conventional, armoured wireline by means of which the tool is connected to a surface location.

Regardless of the precise method of conveying data to the surface location, the method of the invention involves the following actions:

1. If the well includes casing collars, detecting the presence of such collars (preferably by means of abnormally high short spaced density detector readings); and removing their effects from the density logs. The latter occurs by substituting non-collar affected data (ie. data from a region of the well that is not perturbed by the presence of collars) for the collar data.

In the particularly preferred embodiment of the invention the non-collar data for a given region of collar data is the non-collar data immediately preceding the collar data in question in the log. Thus in a normal logging sequence the non-collar data is the region of data adjacent the collar data in the direction towards the total depth of the well.

2. Correcting each density log (ie. the short and long spaced density logs) for the presence of the known dimensions and properties of the casing.

As noted herein this may be achieved through per se known modelling and/or calibration database techniques.

3. Combining the casing-corrected logs in such a way as to compensate for the "non-small" cement annulus.

Figure 3:
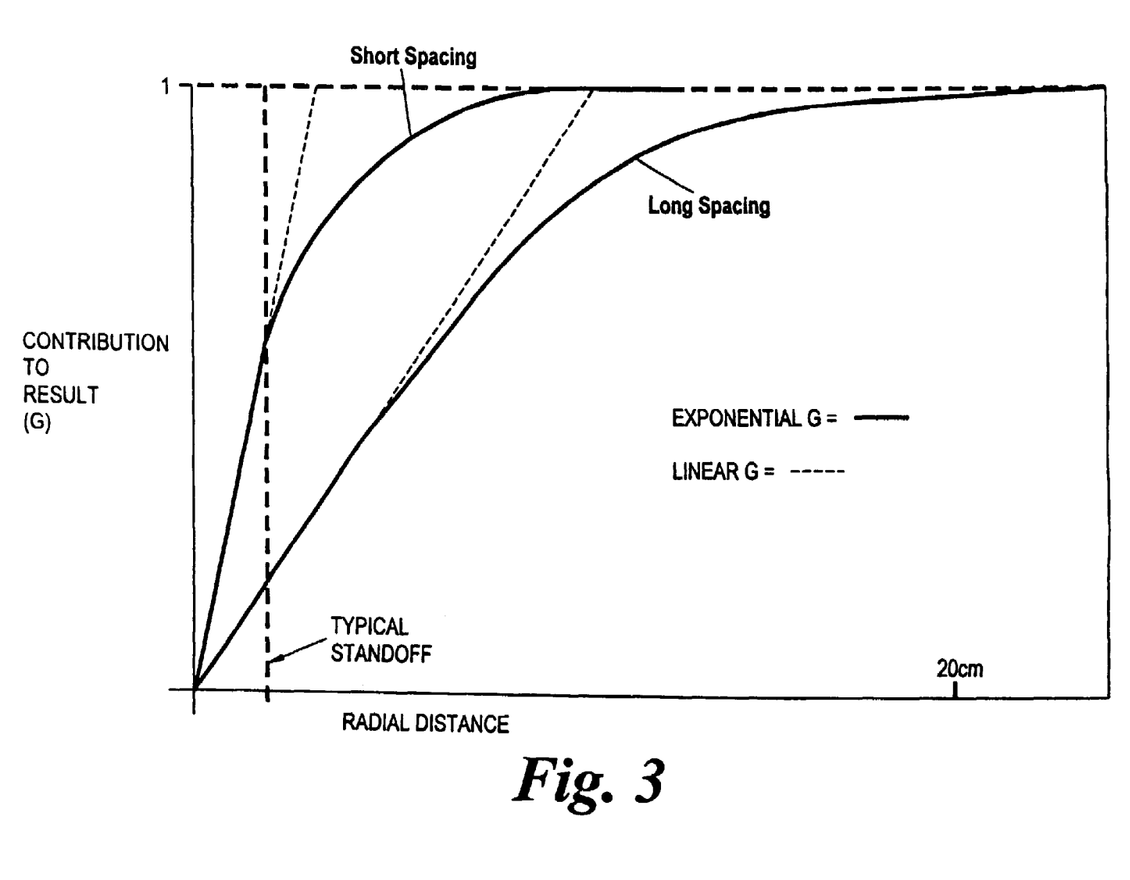
FIG. 3 is a plot of the integrated geometric factor G, characteristic of fractional contribution to the density measurement, against penetration depth in a formation, that illustrates some principles underlying the invention.

This is achieved by firstly approximating the integrated geometric factor (G) of the well/density detector combination to an exponential function of density measurement penetration depth, as illustrated by FIG. 3 which shows such an approximation in a plot of G against penetration distance measured radially from the gamma source.

$$G = 1 - e^{-kr} \quad (1)$$

where
k=constant
r=penetration depth.

Now using geometric-factor theory and assuming that the tool stands off the borehole wall, the apparent measured density is given by:

$$\rho_a = G_m \rho_{mc} + G_f \rho_f \quad (2)$$

where
$\rho$=apparent density
$\rho_{mc}$=mudcake density
$\rho_f$=formation density
$G_m$=mudcake integrated geometric factor
$G_f$=formation integrated geometric factor.

Since the analysis considers only a two-part situation, by definition of geometric factors:

$$G_m + G_f = 1. \quad (3)$$

Combining Equations 2 and 3 gives:

$$\rho_a = G_m \rho_{mc} + (1 - G_m)\rho_f \quad (4)$$

Using the relationship in Equation 1 for G gives:

$$\rho_a = (1 - e^{-kr})\rho_{mc} + e^{-kr}\rho_f. \quad (5)$$

It is possible to estimate $P_{mc}$, but since r is unknown and variable, it is preferable to rearrange Equation 5 to eliminate it:

$$r = \frac{-1}{k} \log_e \left( \frac{\rho_a - \rho_{mc}}{\rho_f - \rho_{mc}} \right). \quad (6)$$

This is true for both detectors, and if there exist parallel standoff conditions the r's are the same, thus:

$$\frac{1}{k_L} \log_e \left( \frac{\rho_{aL} - \rho_{mc}}{\rho_f - \rho_{mc}} \right) = \frac{1}{k_S} \log_e \left( \frac{\rho_{aS} - \rho_{mc}}{\rho_f - \rho_{mc}} \right) \quad (7)$$

where the suffices L and S refer to the long- and short-spaced detectors.

When rearranged, this yields $$\rho_f = (\rho_{aS} - \rho_{mc})^{[1/(1-k_S/k_L)]} (\rho_{aL} - \rho_{mc})^{[1/(1-k_L/k_S)]} + \rho_{mc}. \quad (8)$$

Note that the k's only appear as the ratio $k_S/k_L$. This means that only the ratio of the penetration depths is involved in Equation 8 (this can be derived from FIG. 3). To a first approximation then, the compensation remains valid even if the penetrations change, as long as their ratio stays constant.

Figure 4:
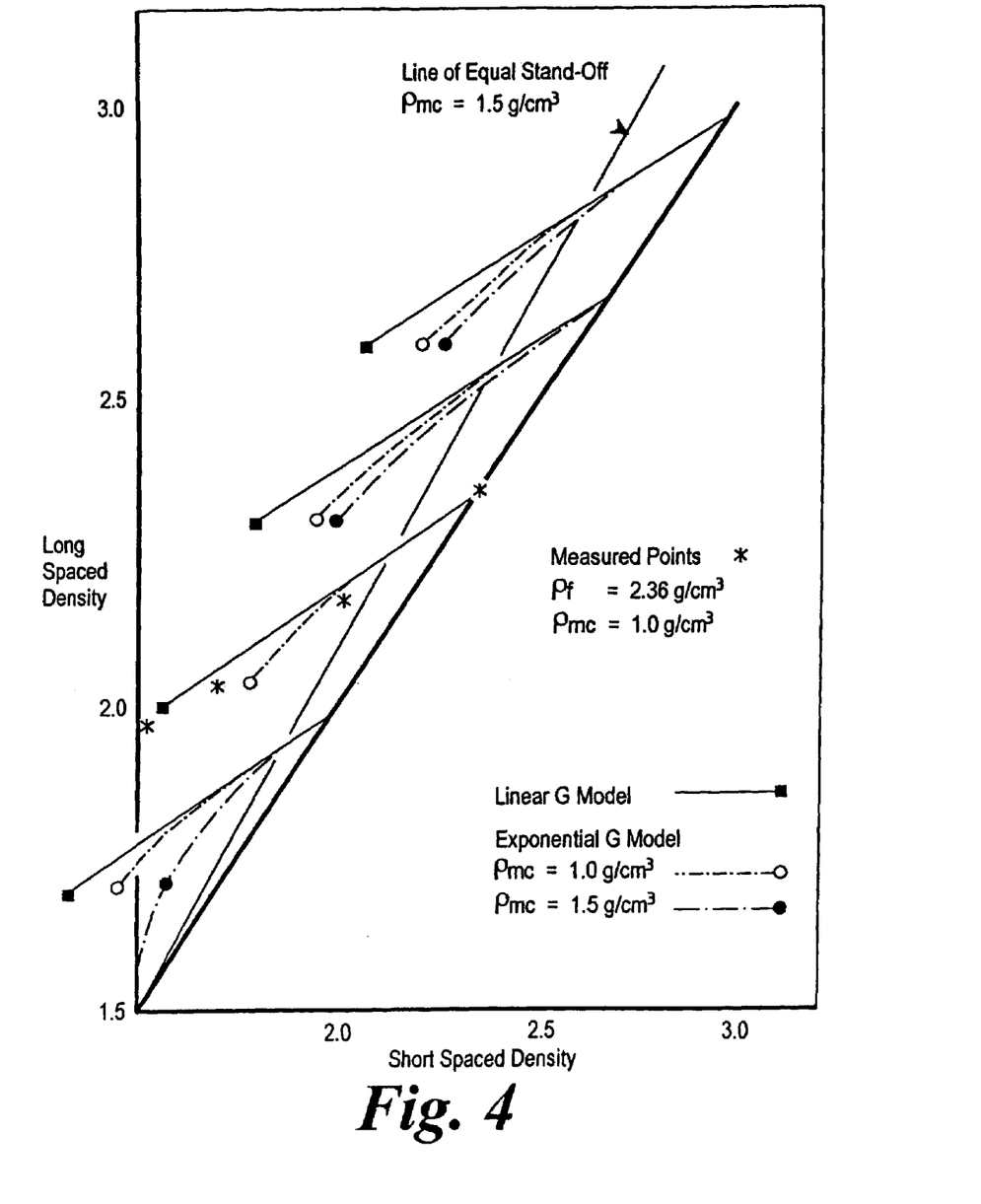
FIG. 4 is a spine and ribs plot derivable through use of the method of the invention.
Figure 5A:
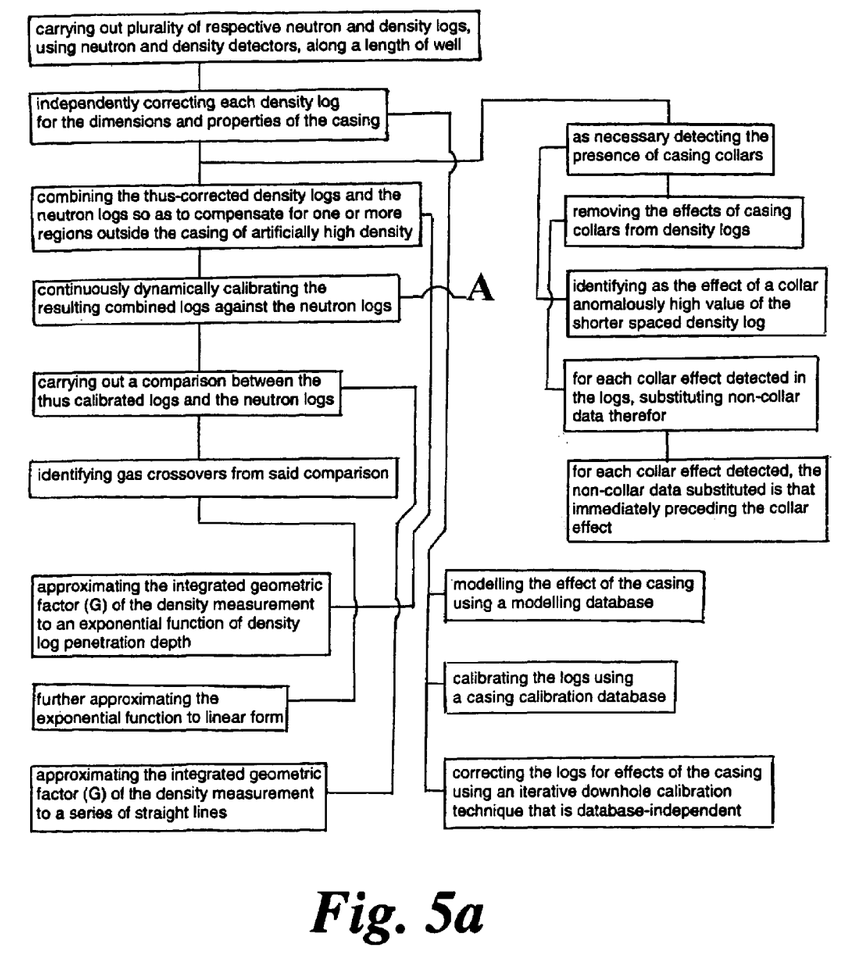
FIG 5a is a schematic block diagram of process steps of the method of the invention.
Figure 5B:
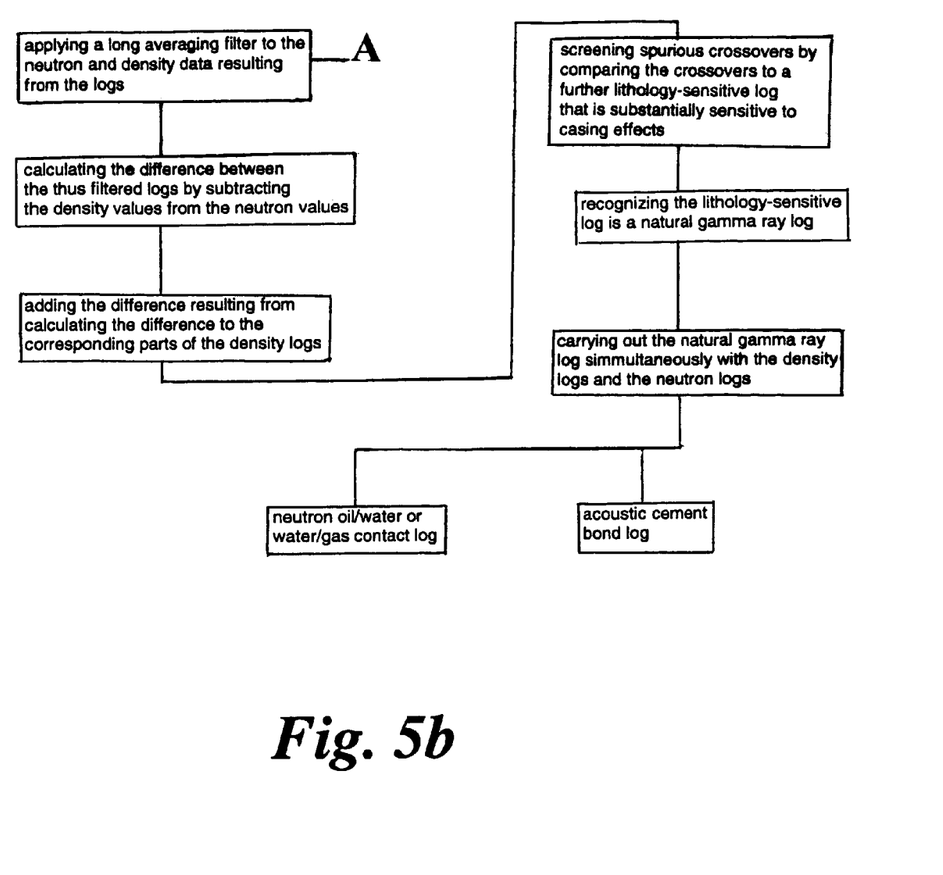

Plotting Equation 8 gives a well-known "spine and ribs" plot as shown in FIG. 4. Although there is a need to estimate $\rho_{mc}$, it is apparent that for corrections up to 0.2-0.25 g/cc, the locus of the correction is very similar, even if $\rho_{mc}$ varies markedly. The ribs rejoin the spine when $\rho_f = \rho_{mc}$.

As a further refinement it is possible further to approximate the equation of "exponential-G" to linear form, as a further simplification.

The considerations of the standoff used only a two-part geometric-factor equation. Therefore, the form of G matters little for penetrations deeper than the standoff, since this appears solely as (1−G). Therefore, it is possible to consider a simpler form of G that should be reasonable for modest corrections (ie., a linear form as in FIG. 3). For small penetrations and, therefore, small standoffs:

$$G = k'r \quad (9)$$

where k'=constant. In this case, as in Equations 4 and 5

$$\rho_a = k'r\rho_{mc} + (1 - k'r)\rho_f. \quad (10)$$

Rearranging as before, $$r = \frac{1}{k'} \left( \frac{\rho_a - \rho_f}{\rho_{mc} - \rho_f} \right). \quad (11)$$

Eliminating r by using both detectors, $$\frac{1}{k'_L} \left( \frac{\rho_{aL} - \rho_f}{\rho_{mc} - \rho_f} \right) = \frac{1}{k'_S} \left( \frac{\rho_{aS} - \rho_f}{\rho_{mc} - \rho_f} \right). \quad (12)$$

Rearranging and simplifying gives:

$$\rho_f = \rho_{aS}(1 - k'_S/k'_L)^{-1} + \rho_{aL}(1 - k'_L/k'_S)^{-1}. \quad (13)$$

Note here that $\rho_{mc}$ has cancelled out.

The spine-and-ribs plot for this linear G model also appears in FIG. 4. Again, the compensation locus varies little from the previous ones for modest corrections. Thus, the compensation is not a strong function of the form of G.

4. The next stage in the logging method involves continuously dynamically calibrating the resulting log against the neutron derived log, to remove residual inconsistencies. Thereafter the pair of neutron and dynamically calibrated density logs is inspected for crossovers that exceed a predetermined amount and consequently signify the presence of gas in the formation.

The method of continuous calibration involves the steps of applying a long averaging filter to both the neutron and density data; calculating the difference, by subtracting the density log from the neutron log; and adding the resulting difference to the original density derived porosity log.

This causes agreement on average between the neutron and density logs without detracting from the ability to identify crossovers of greater than a predetermined magnitude, that indicate the presence of gas.

Running the method steps of the invention in conjunction with a log (such as a natural gamma ray log) that is substantially unaffected by the casing but is sensitive to lithological types, allows the elimination of crossovers that are encountered in lithologies where there is no gas. Such spurious crossovers result for example from voids behind the casing.

It will be apparent that, since the dynamic calibration technique forming part of the invention involves the application of a long averaging filter to the neutron and density logs, it is essential to eliminate the effects of the casing collars before carrying out the averaging. Otherwise the average values of the logs would be artificially high. This would reduce the ability accurately to identify genuine gas-derived crossovers.

The method of the invention has proved highly suitable for combination with a cement bond log and also for operation simultaneously with gas detection and oil/water contact detection logs.

Consequently the method of the invention allows the ability to detect oil/water contact, gas and cement quality to occur in a single pass along the well.

Referring now to FIG. 1 there is shown a wireline tool 10 that is, in conjunction with data processing apparatus to which it is connectable, capable of carrying out the method steps herein.

Tool 10 includes secured in series a gamma sonde 11; a neutron sonde 12; a density sonde 13 including a per se known caliper mechanism 14 for urging the sonde 13 into contact with the casing of the well; a sonic logging sub 16 and conventional downhole components such as a pressure bung and hole finder indicated schematically by numeral 17 at the downhole end of the tool 10.

Density sonde 13 includes per se known short and long spaced detectors.

Tool 10 may include a per se known cartridge (not shown in FIG. 1) containing an electronics section whose functions might include signal conditioning and amplification. However the primary means of obtaining useable data from the tool of FIG. 1 is by way of a per se known armoured wireline (not shown in FIG. 1), on an end of which the tool is driveable into a cased well. The wireline transmits electrical power to the tool 10 and permits data telemetry.

The tool 10 includes electronics whose function concerns the telemetry of logging data via the wireline to e.g. a surface location. At the surface location the wireline may connect to one or more programmed devices (such as a digital computer) that are capable of carrying out the method steps of the invention other than those carried out by the sondes.

FIG. 2 shows a tool 20 that is similar to the FIG. 1 tool, except that it is a self-powered battery/memory tool. Tool 20 includes operatively connected together the components 11-17 of tool 10, and in addition a battery sub 21 and a memory sub 22. The various subs and sondes are operatively connected together so that the battery sub provides power for the tool 20. The tool 20 includes at least one electronics section that is capable of converting the logged data to a form that is storable in a memory device in the memory sub 22.

The tool 20 is deployable by pumping and/or by other known methods to a downhole location. The tool may then be pumped or otherwise conveyed in a controlled way to an uphole location, during which travel it carries out logging operations in accordance with the method of the invention.

Following recovery of the tool 20 to a surface location the stored data may be downloaded from the memory device to eg. a computer that carries out the dynamic calibration of step (d) of claim 1 hereof and, optionally, the comparison of step (e) and optionally any remaining steps of the method of the invention as defined herein and generates desired log plots and data tables.

The tools 10 and 20 each preferably have a maximum diameter in the so-called "compact" or "slim-hole" range, ie. less than 2¼". However other, greater tool component diameters are possible within the scope of the invention.

The invention claimed is:

1. A method of producing a corrected density log comprising steps of correcting and combining a plurality of density logs, obtained using a gamma ray source and relating to a length of well including casing, for the presence of casing, the method comprising the steps of:

(a) correcting each of the said plurality of density logs for the dimensions and properties of the casing wherein said density logs were obtained using a corresponding plurality of density detectors for the dimensions and properties of the casing, said correcting utilizing gamma logs;

(b) combining the thus-corrected density logs to compensate for one or more regions outside the casing; and (c) yielding a resultant output.

2. A method according to claim 1 also including the steps of:(d), as necessary, detecting the presence of casing collars; and (e) removing their effects from the density logs.

3. A method according to claim 2, wherein the steps (d) and (e) occur before the step (b).

4. A method according to claim 2 wherein the step (e) includes the step of:

(e-1) for each collar effect detected in the logs, substituting non-collar data therefore.

5. A method according to claim 4 wherein for each collar effect detected, the non-collar data substituted is that logged immediately preceding the said collar effect.

6. A method according to claim 5 wherein the step (b) includes the step of:

(b-1) approximating the integrated geometric factor (C) of the density measurement to a series of straight lines.

7. A method according to claim 1 wherein the step (a) includes one or more of the steps of:

(a-1) modeling the effect of the casing using a modeling database; and (a-2) calibrating the logs using a casing calibration database.

8. A method according to claim 1 wherein the step (a) includes the step of:
   (a-1) correcting the logs for effects of the casing using an iterative downhole calibration technique that is database independent.

9. A method according to claim 1 wherein the step (b) includes the step of:
   (b-1) approximating the integrated geometric factor (G) of the density measurement to an exponential function of density log penetration depth.

10. A method according to claim 9 including after step (b-1) the further step of:
    (b-2) further approximating the exponential function to linear form.

11. A method according to claim 1 wherein said density logs are obtained while well logging and wherein said steps (a) and (b) are each carried out using a single tool.

12. A method according to claim 1 wherein said density logs are obtained while well logging and wherein said steps (a) and (b) are each carried out by a compact battery/memory tool.

13. A method of correcting a plurality of density logs comprising steps of correcting and combining said plurality of density logs, obtained using a gamma ray source, for the presence of casing, comprising the steps of:
    (a) correcting each of said plurality of density logs for the dimensions and properties of the casing, wherein said density logs were obtained using a corresponding plurality of density detectors for the dimensions and properties of the casing, said correcting utilizing gamma logs and;
    (b) as necessary detecting the presence of casing collars; and
    (c) removing their effects from the density logs: then
    (d) combining the thus-corrected density logs so as to compensate for one or more regions outside the casing; and
    (e) yielding resultant corrected logs;
    wherein the step (b) includes the step of:
    (b-1) identifying as the effect of a collar an anomalously high value of the shorter spaced density log of a pair of the said logs.

14. A method according to claim 13 wherein the step (c) includes the step of:
    (f) for each collar effect detected in the logs, substituting non-collar data therefor.

15. A method according to claim 14 wherein for each collar effect detected, the non-collar data substituted is that logged immediately preceding the said collar effect.

16. A method according to claim 15 wherein the step (d) includes the step of:
    (k) approximating the integrated geometric factor (G) of the density measurement to a series of straight lines.

17. A method according to claim 13 wherein the step (a) includes one or more of the steps of:
    (g) modelling the effect of the casing using a modelling database; and
    (h) calibrating the logs using a casing calibration database.

18. A method according to claim 13 wherein the step (a) includes the step of:
    (a-1) correcting the logs for effects of the casing using an iterative downhole calibration technique that is database-independent.

19. A method according to claim 13 wherein the step (d) includes the steps of:
    (i) approximating the integrated geometric factor (G) of the density measurement to an exponential function of density log penetration depth.

20. A method according to claim 19 including after step (i) the further step of:
    (j) further approximating the exponential function to linear form.

21. A method according to claim 13 wherein said density logs were obtained while well logging and wherein said steps (a) and (d) are each carried out using a single tool.

22. A method according to claim 13 wherein said density logs were obtained while well logging and wherein said steps (a) and (d) are each carried out by a compact battery/memory tool.

23. A method of correcting a plurality of density logs comprising the steps of correcting and combining said plurality logs, for the presence of casing, comprising the steps of:
    (a) correcting each of said plurality of density logs for the dimensions and properties of the casing wherein said density logs were obtained using a corresponding plurality of density detectors for the dimensions and properties of the casing, including;
    (a-1) modelling the effect of the casing using a modelling database; and
    (a-2) calibrating the logs using a casing calibration database;
    (b) combining the thus-corrected density logs so as to compensate for one or more regions outside the casing, including;
    (b-1) approximating the integrated geometric factor (G) of the density measurement to an exponential function of density log penetration depth; and
    (c) providing corrected logs.

24. A method according to claim 23 including after step (b-1) the further step of:
    (d) further approximating the exponential function to linear form.

25. A method of correcting a plurality of well density logs comprising steps of correcting and combining said plurality logs, for the presence of casing, comprising the steps of:
    (a) correcting each of said plurality of density logs for the dimensions and properties of the casing, wherein said density logs were obtained using a corresponding plurality of density detectors for the dimensions and properties of the casing, including;
    (a-1) correcting the logs for effects of the casing using an iterative downhole calibration technique that is database-independent;
    (b) combining the thus-corrected density logs so as to compensate for one or more regions outside the casing, including;
    (b-1) approximating the integrated geometric factor (G) of the density measurement to an exponential function of density log penetration depth; and
    (c) providing a resultant output.

26. A method according to claim 25 including after step (b-1) the further step of:
    (b-2) further approximating the exponential function to linear form.

27. A method of correcting a plurality of density logs comprising steps of correcting and combining said plurality logs, for the presence of casing, comprising the steps of:
    (a) correcting each of said plurality of density logs for the dimensions and properties of the casing wherein said density logs were obtained using a corresponding plurality of density detectors for the dimensions and properties of the casing;

(b) as necessary detecting the presence of casing collars, including identifying as the effect of a collar as an anomalously high value of the shorter spaced density log of a pair of said logs;
(c) removing their effects from the density logs including for each collar effect detected in the logs, substituting non-collar data therefor, wherein the non-collar data substituted is that logged immediately preceding the said collar effect;
(d) combining the thus-corrected density logs to compensate for one or more regions outside the casing including approximating the integrated geometric factor (G) of the density measurement to a series of straight lines, and
(e) providing a resultant output.

28. A method according to claim 27 wherein (G) is a plot of penetration distance measured radially from a gamma source.

29. A method according to claim 28, wherein (G) is expressed by the equation: $G=1-e^{-kr}$, where k=constant and r=penetration depth, wherein said density logs are obtained using both long-spaced and short-spaced detectors, and wherein formation density ($\rho_f$) is calculated as a function of apparent density obtained by the short-spaced detectors and apparent density obtained by the long-spaced detectors and as a function of short and long detector constants.

* * * * *

UNITED STATES PATENT AND TRADEMARK OFFICE
CERTIFICATE OF CORRECTION

PATENT NO. : 7,328,106 B2 Page 1 of 1
APPLICATION NO. : 11/145063
DATED : February 5, 2008
INVENTOR(S) : Stefan Eric Edward Calvert et al.

It is certified that error appears in the above-identified patent and that said Letters Patent is hereby corrected as shown below:

Column 2, line 30, insert the heading --SUMMARY OF THE INVENTION--;

Column 8, line 60, replace "(C)" with --(G)--;

Column 9, lines 4-5, replace "database independent" with --database-independent--.

Signed and Sealed this

Twenty-seventh Day of May, 2008

JON W. DUDAS
*Director of the United States Patent and Trademark Office*